US012692145B2

(12) United States Patent
Kang et al.

(10) Patent No.: US 12,692,145 B2
(45) Date of Patent: Jul. 28, 2026

(54) COLD WATER TANK FOR DIRECT WATER PURIFIER

(71) Applicant: COWAY CO., LTD., Gongju-si (KR)

(72) Inventors: Hee Joo Kang, Gongju-si (KR); Hee Do Jung, Gongju-si (KR); Chan Jung Park, Gongju-si (KR); Jong Hwan Lee, Gongju-si (KR); Hyun Kang Lee, Gongju-si (KR); Hyun Goo Kim, Gongju-si (KR); Yoo Won Oh, Gongju-si (KR); Da Woon Jung, Gongju-si (KR); Min Chul Yong, Gongju-si (KR); Dong Min Oh, Gongju-si (KR); Seong Min Park, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 280 days.

(21) Appl. No.: 18/565,746

(22) PCT Filed: Feb. 8, 2022

(86) PCT No.: PCT/KR2022/001885
§ 371 (c)(1),
(2) Date: Nov. 30, 2023

(87) PCT Pub. No.: WO2022/255589
PCT Pub. Date: Dec. 8, 2022

(65) Prior Publication Data

US 2024/0262674 A1 Aug. 8, 2024

(30) Foreign Application Priority Data

Jun. 2, 2021 (KR) ........................ 10-2021-0071619

(51) Int. Cl.
*B67D 1/08* (2006.01)
*B67D 1/00* (2006.01)

(52) U.S. Cl.
CPC ......... *B67D 1/0859* (2013.01); *B67D 1/0004* (2013.01); *B67D 1/0801* (2013.01); *B67D 2210/00062* (2013.01)

(58) Field of Classification Search
CPC .. B67D 1/0859; B67D 1/0857; B67D 1/0858; B67D 1/08; B67D 1/0801;
(Continued)

(56) References Cited

U.S. PATENT DOCUMENTS

| | | | | | |
|---|---|---|---|---|---|
| 2,052,410 | A * | 8/1936 | Kucher | F25D 31/003 62/503 | |
| 2,167,547 | A * | 7/1939 | Holderle | B67D 1/0872 62/391 | |

(Continued)

FOREIGN PATENT DOCUMENTS

| | | | |
|---|---|---|---|
| CN | 107923688 | A | 4/2018 |
| CN | 110352174 | A | 10/2019 |

(Continued)

OTHER PUBLICATIONS

DE-29901221-U1 English Translation (Year: 1999).*
(Continued)

*Primary Examiner* — Frantz F Jules
*Assistant Examiner* — Devon Moore
(74) *Attorney, Agent, or Firm* — Oblon, McClelland, Maier & Neustadt, L.L.P.

(57) ABSTRACT

A cold water tank for a direct water purifier is provided. The cold water tank for a direct water purifier may comprise: a tank housing having an internal space and having a height in the longitudinal direction at least four times greater than the maximum width in the lateral direction, and disposed in the longitudinal direction so as to introduce a fluid from the upper side and discharge the fluid to the lower side; an evaporator disposed in the internal space so as to guide
(Continued)

movement of a refrigerant for cooling the fluid; a connection part disposed under the tank housing to convert the direction of the fluid moving downward to an upper side; a cold water pipe having a lower end connected to the connection part and extending so as to guide the cooled fluid to an upper side of the internal space, and disposed in the longitudinal direction in the internal space; and a cold water outlet formed at the upper end of the tank housing and connected to the upper end of the cold water pipe to discharge the fluid to the outside of the tank housing.

16 Claims, 10 Drawing Sheets

(58) Field of Classification Search

CPC ........... B67D 2210/00062; B67D 2210/00104; B67D 1/0884; B67D 2210/00049; B67D 2210/00118; B67D 3/0009; B67D 1/0014; B67D 7/80; B67D 2210/00047; F25D 2331/806; F25D 23/126; F25D 31/002; F25D 31/003; F25D 31/006; F25D 31/005

USPC ........................................ 62/457.4, 394, 389

See application file for complete search history.

(56) References Cited

U.S. PATENT DOCUMENTS

| | | | | | |
|---|---|---|---|---|---|
| 3,263,442 | A * | 8/1966 | Timmersman | F25D 31/003 | 62/394 |
| 3,882,693 | A * | 5/1975 | Hiller | F28F 1/02 | 62/394 |
| 4,061,184 | A * | 12/1977 | Radcliffe | F28D 7/022 | 165/169 |
| RE32,354 | E * | 2/1987 | Savage | B67D 1/0001 | 222/499 |
| 5,803,163 | A * | 9/1998 | Goulet | F28D 1/06 | 165/172 |
| 9,897,374 | B2 * | 2/2018 | Kim | F25D 31/003 | |
| 2010/0270327 | A1 | 10/2010 | Bassett et al. | | |

FOREIGN PATENT DOCUMENTS

| | | | | | |
|---|---|---|---|---|---|
| DE | 29901221 | U1 * | 11/1999 | B67D 1/0857 |
| GB | 2586038 | A * | 2/2021 | B67D 1/1247 |
| KR | 20120063883 | A * | 6/2012 | B67D 1/0859 |
| KR | 10-1228834 81 | | 2/2013 | |
| KR | 10-2014-0055168 | | 5/2014 | |
| KR | 10-1439831 | B1 | 9/2014 | |
| KR | 10-1658496 | B1 | 9/2016 | |
| KR | 10-2016-0131787 | A | 11/2016 | |
| KR | 20160139871 | A * | 12/2016 | B01D 35/00 |
| KR | 10-2053784 | B1 | 12/2019 | |
| KR | 10-2020-0008263 | A | 1/2020 | |
| KR | 10-2020-0078898 | A | 7/2020 | |
| KR | 20200120020 | A * | 10/2020 | F25D 31/003 |
| KR | 10-2021-0030058 | A | 3/2021 | |

OTHER PUBLICATIONS

KR-20120063883-A English Translation (Year: 2012).*

KR-20160139871-A English Translation (Year: 2016).*

KR-20200120020-A English Translation (Year: 2020).*

International Search Report issued May 16, 2022 in PCT/KR2022/001885, filed on Feb. 8, 2022, 2 pages.

Office Action issued in Chinese Patent Application No. 202280039780.3 on Jan. 20, 2026, with English translation.

Office Action issued in Korean Patent Application No. 10-2021-0071619 on May 22, 2026, with English Translation.

* cited by examiner

30 : 32,34,36,38,39

COLD WATER TANK FOR DIRECT WATER PURIFIER

TECHNICAL FIELD

The present disclosure relates to a cold water tank for a direct water purifier, and more particularly, to a cold water tank for a direct water purifier that can reduce manufacturing costs of a cold water tank for extracting cold water, improve cold water extraction performance, and allow a cold water pipe to be easily installed or separated.

BACKGROUND ART

Generally, a cold water tank is an apparatus for cooling water supplied from a tap, a water bottle, or a clean water storage device and providing the cooled water to a user. Cold water tanks are mostly installed in a water purifier, a sparkling water maker, a cold/hot water dispenser, and the like to generate low-temperature drinking water but may be used in various fields in which generation of cold water is necessary.

Korean Unexamined Patent Application Publication No. 10-2020-0008263 of Coway Co., Ltd. discloses a conventional cold water tank. The cold water tank includes a tank main body and a cooling unit configured to cool water stored in the tank main body to generate cold water. Here, clean water introduced through an inlet formed at an upper portion of the tank main body is discharged as cold water through an outlet formed at a lower portion of the tank main body, and in a process in which the discharged cold water is discharged from the water purifier and delivered to the user, the cold water receives heat from the outside, and the temperature of the cold water increases. As a result, there is a problem in that cold water extraction efficiency felt by the user is reduced.

Korean Patent Registration No. 10-1658496 of Hyewone Electronics Co., Ltd. discloses a cooling device for a water purifier that includes a cold water tank and a cooling pipe configured to come in contact with an outer peripheral surface of the cold water tank and cool water stored in the cold water tank. Since the cooling pipe is disposed at the outer peripheral surface of the cold water tank, cold air of the cooling pipe is discharged to the outside instead of being transferred only to the cold water tank, and thus there is a problem in that cooling efficiency is reduced.

Korean Patent Registration No. 10-2053784 of Wonbong Co., Ltd. discloses a cold water tank for a water purifier that includes a tank main body, a cooling coil surrounding an outer peripheral surface of the tank main body, and a heat insulating material surrounding the cooling coil. Although the heat insulating material prevents the cooling coil from being discharged to the outside, since the cooling coil does not directly come in contact with water stored in the tank main body, and there is no configuration for controlling a movement flow of water in a process in which cooled water moves to a lower portion of the tank main body due to a density difference caused by cooling, there is a problem in that cooling efficiency is reduced. Also, although the cooled water is discharged by moving upward through an outflow pipe after moving to the lower portion of the tank main body, there is a problem in that it is difficult to separate the outflow pipe from the tank main body.

DISCLOSURE

Technical Problem

One embodiment of the present disclosure is directed to providing a cold water tank for a direct water purifier in which a cold water pipe extending upward is disposed inside a tank housing, thereby minimizing heat loss occurring from the cold water pipe during discharge of cold water.

Also, one embodiment of the present disclosure is directed to providing a cold water tank for a direct water purifier in which a first coupling portion, into which a cold water pipe is able to be inserted in a longitudinal direction, is formed on a bottom portion of a tank housing, thereby facilitating replacement of the cold water pipe and facilitating installation of the cold water pipe inside the tank housing.

Also, one embodiment of the present disclosure is directed to providing a cold water tank for a direct water purifier in which a first fixing member configured to fix a cold water pipe inserted into a first coupling portion is provided, thereby facilitating insertion of the cold water pipe and firmly fixing the cold water pipe to the first coupling portion.

Also, one embodiment of the present disclosure is directed to providing a cold water tank for a direct water purifier that is formed in a structure in which a connector protrudes to a lower outer space of a tank housing, thereby facilitating injection molding of the tank housing.

Also, one embodiment of the present disclosure is directed to providing a cold water tank for a direct water purifier in which a partition configured to divide an inner space of a tank housing in a transverse direction is added, thereby decreasing a movement speed of clean water moving downward inside the tank housing and improving cooling efficiency.

Also, one embodiment of the present disclosure is directed to providing a cold water tank for a direct water purifier in which an area of a through-hole that allows clean water to pass through a partition dividing an inner space of a tank housing in a transverse direction is optimized, thereby controlling an amount of clean water passing through the partition and improving cooling efficiency.

Also, one embodiment of the present disclosure is directed to providing a cold water tank for a direct water purifier in which a protrusion is formed on an outer side portion of a partition, thereby fixing the partition to an inside of a tank housing.

Also, one embodiment of the present disclosure is directed to providing a cold water tank for a direct water purifier in which a refrigerant pipe is formed to extend in a longitudinal direction, and an upper bending portion and a lower bending portion are formed at the refrigerant pipe, thereby increasing a contact area between the refrigerant pipe and clean water and improving cooling efficiency.

Also, one embodiment of the present disclosure is directed to providing a cold water tank for a direct water purifier in which a first through-hole, through which a lower bending portion of a refrigerant pipe is able to pass, is formed in a partition, thereby facilitating installation of the partition at the refrigerant pipe.

Also, one embodiment of the present disclosure is directed to providing a cold water tank for a direct water purifier in which an upper end portion of a cold water pipe is formed to be bent in a transverse direction and inserted into a second coupling portion formed at a side surface of a tank housing, thereby facilitating installation of the upper end portion of the cold water pipe inside the tank housing.

Also, one embodiment of the present disclosure is directed to providing a cold water tank for a direct water purifier in which a slot-shaped second through-hole, through which a cold water pipe is able to pass, is formed in a partition, and a space in which the cold water pipe is able to be elastically deformed to an opposite side of a second coupling portion even while passing through the second through-hole is provided, thereby facilitating installation or separation of an upper end portion of the cold water pipe at or from the second coupling portion.

Also, one embodiment of the present disclosure is directed to providing a cold water tank for a direct water purifier in which a temperature sensor is disposed at a lower side portion, thereby measuring a temperature of a fluid and controlling a temperature of a refrigerant.

In addition, another embodiment of the present disclosure is directed to providing a cold water tank for a direct water purifier in which a cold water through-hole is formed in a side surface of a first coupling portion of a tank housing to allow clean water, which has moved downward, to move to a cold water pipe through the cold water through-hole, thereby facilitating installation of the cold water tank inside a water purifier due to not requiring a connection pipe that protrudes downward.

Objectives of the present disclosure are not limited to the above-mentioned objectives, and other unmentioned objectives should be clearly understood by those of ordinary skill in the art to which the present disclosure pertains from the description below.

Technical Solution

One aspect of the present disclosure provides a cold water tank for a direct water purifier, the cold water tank including: a tank housing having an inner space formed therein, formed so that a height in a longitudinal direction is greater than or equal to at least four times the maximum width in a transverse direction, and disposed in the longitudinal direction so that a fluid is introduced from an upper side and the fluid is discharged to a lower side: an evaporator disposed in the inner space to guide movement of a refrigerant for cooling the fluid: a connector disposed under the tank housing to change a movement direction of the fluid from downward to upward: a cold water pipe having a lower end portion connected to the connector, formed to extend to guide the cooled fluid to an upper side of the inner space, and disposed in the longitudinal direction in the inner space; and a cold water outlet formed at an upper end portion of the tank housing and connected to an upper end of the cold water pipe to discharge the fluid to the outside of the tank housing.

Here, the connector may include a first coupling portion having a cylindrical shape and protruding upward from a bottom portion of the tank housing so that the lower end portion of the cold water pipe is inserted into the first coupling portion in the longitudinal direction.

Here, the connector may further include a first fixing member disposed between an outer peripheral surface of the cold water pipe and an inner peripheral surface of the first coupling portion so that the lower end portion of the cold water pipe is fixed while inserted into the first coupling portion.

Here, the connector may include: a first outlet which is hollow and protrudes downward from a bottom surface of the tank housing so that the fluid of the inner space is discharged to the outside; a first inlet which is disposed to be spaced apart from the first outlet and protrudes downward from the bottom portion of the tank housing so that the fluid discharged through the first outlet is introduced into the inner space through the first coupling portion; and a connection pipe which has one end connected to the first outlet and the other end connected to the first inlet to guide the fluid discharged through the first outlet to the first inlet.

Here, the connector may further include at least one cold water through-hole formed to pass through a side surface of a lower end portion of the first coupling portion, and the cold water pipe may have a lower end coupled to the first coupling portion while spaced apart from the bottom portion of the tank housing so that the lower end of the cold water pipe is disposed at an upper side of the cold water through-hole.

Here, the cold water tank may further include at least one partition configured to divide the inner space in the transverse direction and having a plurality of through-holes formed therein.

Here, a ratio between an entire area of the partition and areas of the plurality of through-holes may be in a range of 3:1 to 14:1.

Here, an outer side portion of the partition may be formed in a shape that corresponds to an inner side surface of the tank housing, the partition may include at least one protrusion that protrudes from the outer side portion of the partition and comes in contact with the inner side surface of the tank housing, and the outer side portion of the partition may be disposed to be spaced apart from the inner side surface of the tank housing.

Here, the evaporator may include a refrigerant pipe having both end portions passing through a ceiling portion of the tank housing and a central portion disposed in the inner space, the refrigerant pipe may include a lower bending portion formed to extend in the longitudinal direction and configured to change a movement direction of the refrigerant from downward to upward, and the plurality of through-holes may include a plurality of first through-holes through which the refrigerant pipe passes.

Here, the evaporator may include a refrigerant pipe having both end portions passing through a ceiling portion of the tank housing and a central portion disposed in the inner space, the refrigerant pipe may include N upper bending portions formed to extend in the longitudinal direction and configured to change a movement direction of the refrigerant from upward to downward and (N+1) lower bending portions configured to change the movement direction of the refrigerant from downward to upward, and the plurality of through-holes may include a plurality of first through-holes through which the refrigerant pipe passes (N is a natural number).

Here, the first through-holes may be formed to extend so that the lower bending portions pass therethrough.

Here, the cold water pipe may have an upper end portion formed to be bent in the transverse direction, the cold water outlet may include a second coupling portion formed at a side surface of the upper end portion of the tank housing and protruding from a side of the cold water outlet that is near the inner space so that the upper end portion of the cold water pipe is inserted into the second coupling portion, and the plurality of through-holes may include second through-holes through which the cold water pipe passes.

Here, the second through-hole may be formed to extend in a direction opposite to the direction in which the upper end portion of the cold water pipe is bent so that the cold water pipe is able to be elastically deformed while passing through the second through-hole.

Here, the second through-hole may have a pair of fixing protrusions formed to protrude from both inner side surfaces of the second through-hole in a direction perpendicular to an extending direction of the second through-hole so that the cold water pipe inserted to pass through the second through-hole is fixed to one side of the second through-hole in the extending direction thereof.

Here, the cold water tank may further include a first temperature sensor provided in the tank housing so that a first sensing portion of the first temperature sensor is disposed to be spaced apart from an upper portion of the evaporator disposed near the cold water outlet and measures a temperature of the fluid.

Here, the first sensing portion may be disposed to be spaced 20 mm or more and 30 mm or less from the upper portion of the evaporator disposed near the cold water outlet.

Here, the cold water tank may further include a second temperature sensor provided in the tank housing so that a second sensing portion of the second temperature sensor is disposed to be spaced apart from a lower portion of the evaporator disposed near the bottom portion of the tank housing and measures a temperature of the fluid.

Here, the second sensing portion may be disposed to be spaced 20 mm or more and 30 mm or less from the lower portion of the evaporator disposed near the bottom portion of the tank housing.

Advantageous Effects

In a cold water tank for a direct water purifier according to one embodiment of the present disclosure, since a cold water pipe extending upward is disposed inside a tank housing, heat loss occurring from the cold water pipe during discharge of cold water can be minimized.

Also, in a cold water tank for a direct water purifier according to one embodiment of the present disclosure, since a first coupling portion, into which a cold water pipe is able to be inserted in a longitudinal direction, is formed on a bottom portion of a tank housing, replacement of the cold water pipe can be facilitated, and installation of the cold water pipe inside the tank housing can be facilitated.

Also, in a cold water tank for a direct water purifier according to one embodiment of the present disclosure, since a first fixing member configured to fix a cold water pipe inserted into a first coupling portion is provided, insertion of the cold water pipe can be facilitated, and the cold water pipe can be firmly fixed to the first coupling portion.

Also, since a cold water tank for a direct water purifier according to one embodiment of the present disclosure is formed in a structure in which a connector protrudes to a lower outer space of a tank housing, injection molding of the tank housing is facilitated.

Also, in a cold water tank for a direct water purifier according to one embodiment of the present disclosure, since a partition configured to divide an inner space of a tank housing in a transverse direction is added, a movement speed of clean water moving downward inside the tank housing can be decreased, and cooling efficiency can be improved.

Also, in a cold water tank for a direct water purifier according to one embodiment of the present disclosure, since an area of a through-hole that allows clean water to pass through a partition dividing an inner space of a tank housing in a transverse direction is optimized, an amount of clean water passing through the partition can be controlled, and cooling efficiency can be improved.

Also, in a cold water tank for a direct water purifier according to one embodiment of the present disclosure, since a protrusion is formed on an outer side portion of a partition, the partition can be fixed to an inside of a tank housing.

Also, in a cold water tank for a direct water purifier according to one embodiment of the present disclosure, since a refrigerant pipe is formed to extend in a longitudinal direction, and an upper bending portion and a lower bending portion are formed at the refrigerant pipe, a contact area between the refrigerant pipe and clean water can be increased, and cooling efficiency can be improved.

Also, in a cold water tank for a direct water purifier according to one embodiment of the present disclosure, since a first through-hole, through which a lower bending portion of a refrigerant pipe is able to pass, is formed in a partition, the partition can be easily installed at the refrigerant pipe.

Also, in a cold water tank for a direct water purifier according to one embodiment of the present disclosure, since an upper end portion of a cold water pipe is formed to be bent in a transverse direction and inserted into a second coupling portion formed at a side surface of a tank housing, the upper end portion of the cold water pipe can be easily installed inside the tank housing.

Also, in a cold water tank for a direct water purifier according to one embodiment of the present disclosure, since a slot-shaped second through-hole, through which a cold water pipe is able to pass, is formed in a partition, and a space in which the cold water pipe is able to be elastically deformed to an opposite side of a second coupling portion even while passing through the second through-hole is provided, an upper end portion of the cold water pipe can be easily installed at or separated from the second coupling portion.

Also, in a cold water tank for a direct water purifier according to one embodiment of the present disclosure, since a temperature sensor is disposed at a lower side portion, a temperature of a fluid can be measured, and a temperature of a refrigerant can be controlled.

In addition, in a cold water tank for a direct water purifier according to another embodiment of the present disclosure, since a cold water through-hole is formed in a side surface of a first coupling portion of a tank housing to allow clean water, which has moved downward, to move to a cold water pipe through the cold water through-hole, the cold water tank can be easily installed inside a water purifier due to not requiring a connection pipe that protrudes downward.

Advantageous effects of the present disclosure are not limited to the above-mentioned advantageous effects and should be understood as including all effects inferable from configurations of the present disclosure described in the detailed description or claims of the present disclosure.

MODES OF THE INVENTION

Figure 1:
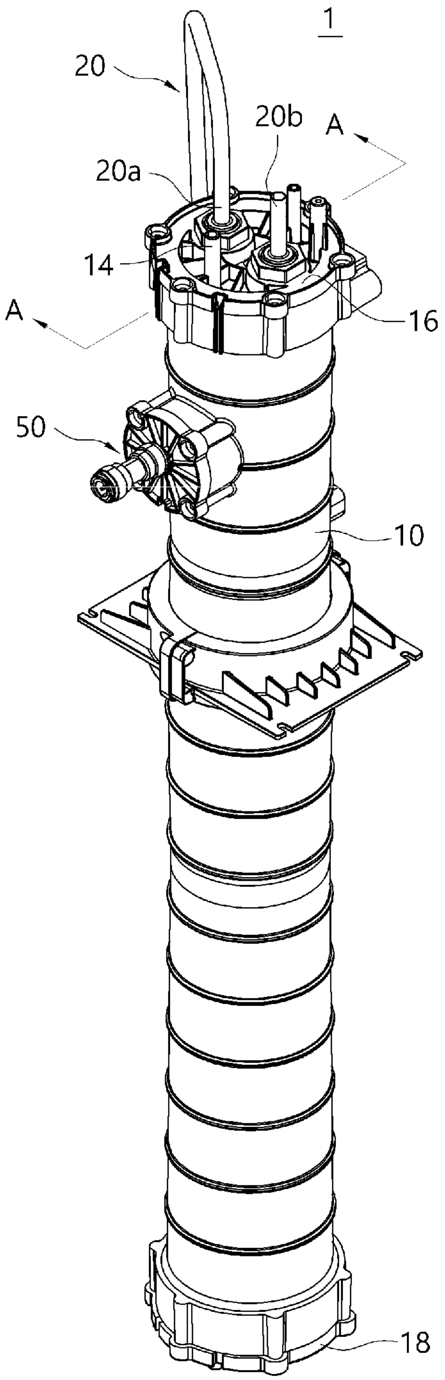
FIG. 1 is a perspective view of a cold water tank for a direct water purifier according to one embodiment of the present disclosure.

Words or terms used in the specification and the claims should not be interpreted as being limited to their general or dictionary meanings and should be interpreted to have meanings and concepts consistent with the technical spirit of the present disclosure, according to the principle that the inventor may define terms and concepts thereof in order to describe his or her invention in the best possible way.

Therefore, the embodiments described in the specification and the configurations illustrated in the drawings are only exemplary embodiments of the present disclosure and do not represent the entire technical spirit of the present disclosure, and thus various equivalents and modifications that can replace the embodiments may be present at the time of filing this application.

In the present specification, terms such as “include” or “have” are intended to describe the presence of features, numbers, steps, operations, components, parts, or combinations thereof mentioned herein and should not be understood as precluding the possibility of presence or addition of one or more other features, numbers, steps, operations, components, parts, or combinations thereof.

When a certain component is described as being “in front of,” “behind,” “above,” or “under” another component, unless there is some special circumstance, this not only includes a case in which the component is disposed right “in front of,” “behind,” “above,” or “under” the other component, but also includes a case in which another component is disposed between the two components. Also, when a certain component is described as being “connected” to another component, unless there is some special circumstance, this not only includes a case in which the component and the other component are directly connected to each other, but also includes a case in which the component and the other component are indirectly connected to each other.

In order to clearly describe the present disclosure, parts irrelevant to the description are omitted from the drawings, and like or similar components are denoted by like reference numerals throughout the specification.

Figure 2:
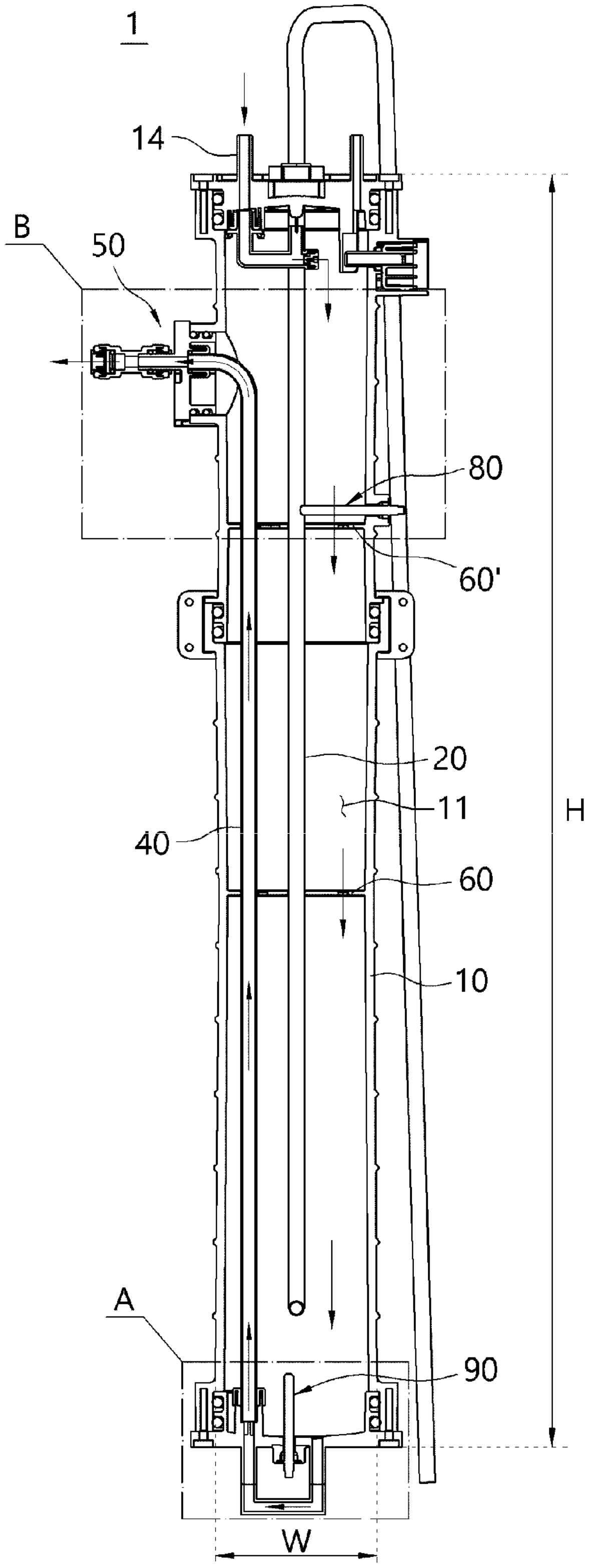
FIG. 2 is an enlarged cross-sectional view along line A-A of FIG. 1.
Figure 3:
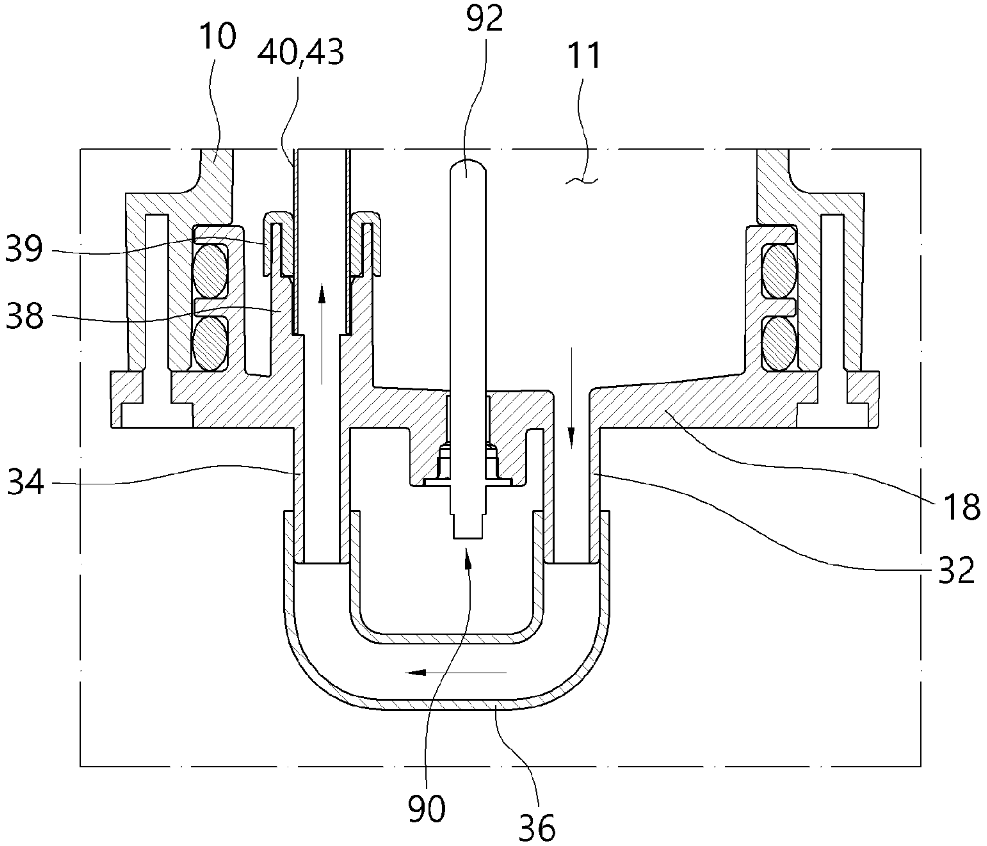
FIG. 3 is an enlarged view of portion A shown in FIG. 2.
Figure 4:
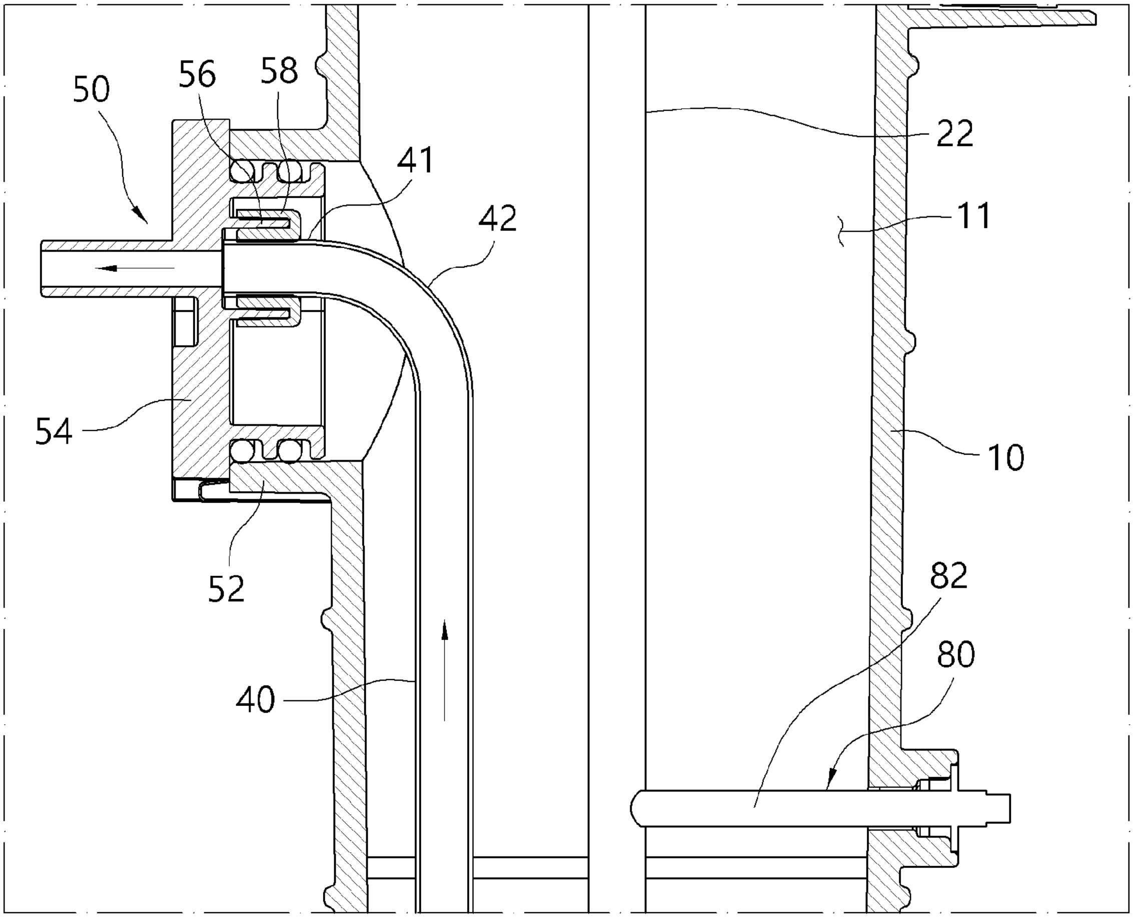
FIG. 4 is an enlarged view of portion B shown in FIG. 2.
Figure 5:
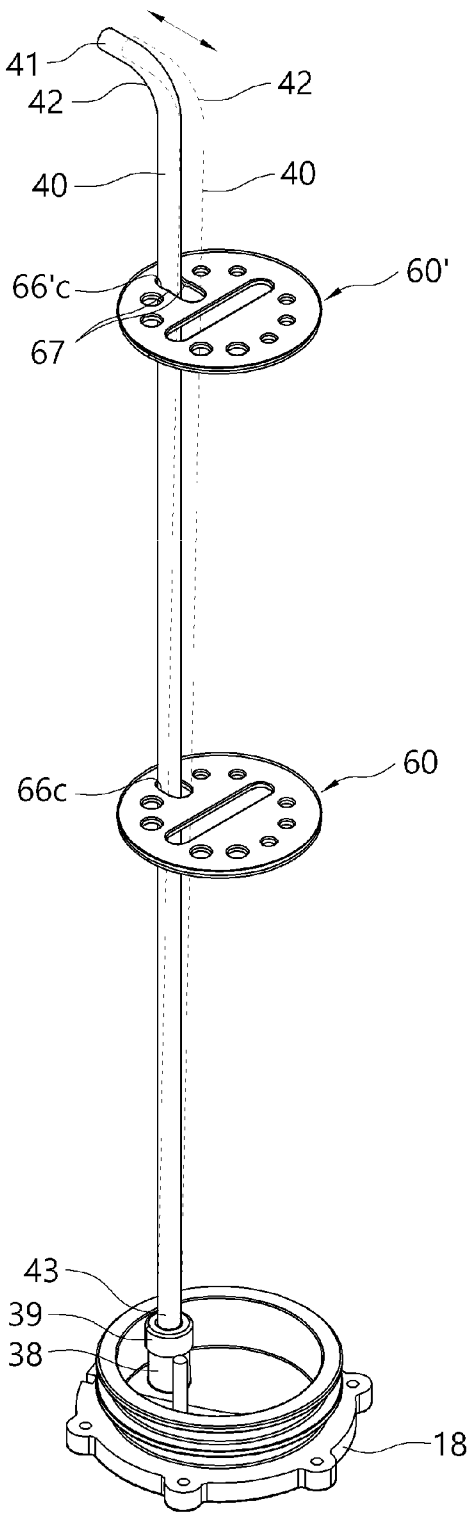
FIG. 5 is an enlarged view of a cold water pipe of the cold water tank for a direct water purifier according to one embodiment of the present disclosure.
Figure 6:
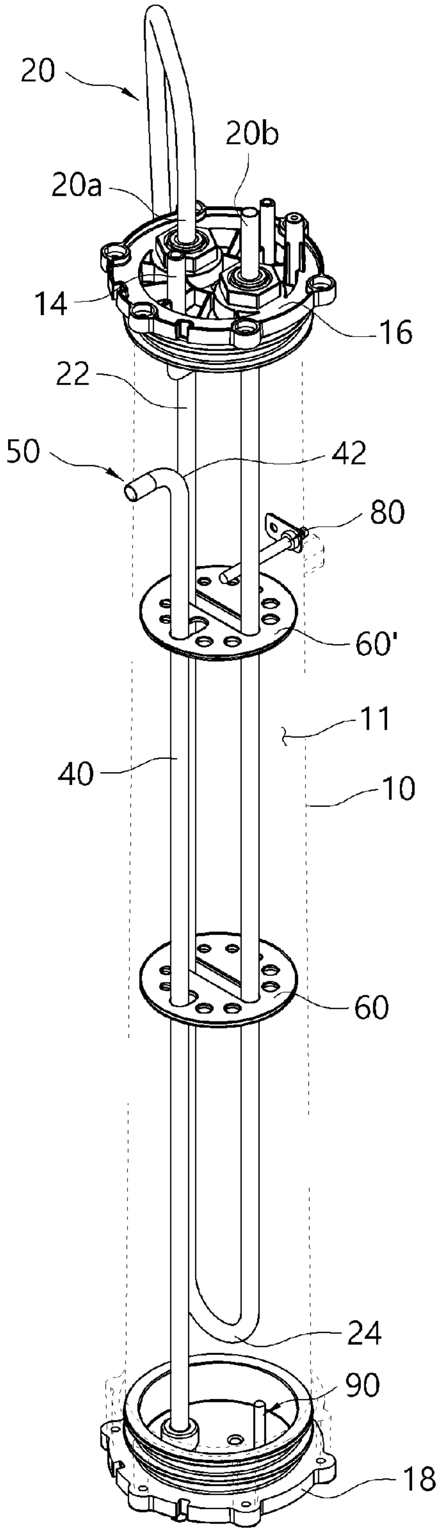
FIG. 6 is an enlarged view of a refrigerant pipe and a partition of the cold water tank for a direct water purifier according to one embodiment of the present disclosure.
Figure 7:
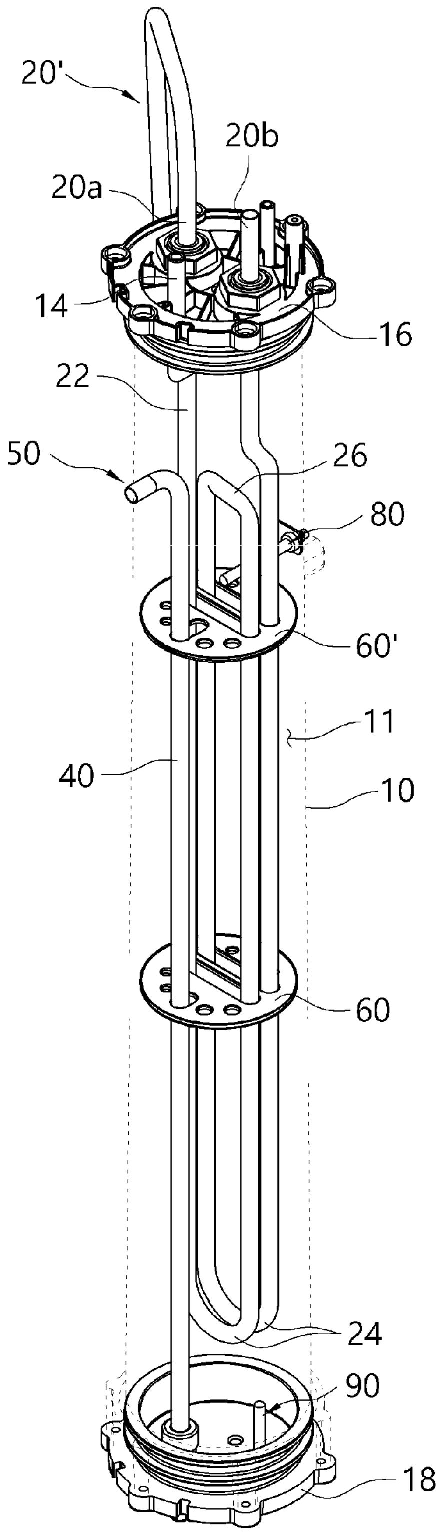
FIG. 7 is an enlarged view of a modification of the refrigerant pipe and the partition of the cold water tank for a direct water purifier according to one embodiment of the present disclosure.

Hereinafter, a cold water tank for a direct water purifier according to the present disclosure will be described with reference to the drawings. FIG. 1 is a perspective view of a cold water tank for a direct water purifier according to one embodiment of the present disclosure. FIG. 2 is an enlarged cross-sectional view along line A-A of FIG. 1. FIG. 3 is an enlarged view of portion A shown in FIG. 2. FIG. 4 is an enlarged view of portion B shown in FIG. 2. FIG. 5 is an enlarged view of a cold water pipe of the cold water tank for a direct water purifier according to one embodiment of the present disclosure. FIG. 6 is an enlarged view of a refrigerant pipe and a partition of the cold water tank for a direct water purifier according to one embodiment of the present disclosure. FIG. 7 is an enlarged view of a modification of the refrigerant pipe and the partition of the cold water tank for a direct water purifier according to one embodiment of the present disclosure.

As illustrated in FIGS. 1 to 4, a cold water tank 1 for a direct water purifier according to one embodiment of the present disclosure includes a tank housing 10, an evaporator 20, a connector 30, a cold water pipe 40, a cold water outlet 50, partitions 60 and 60', a first temperature sensor 80, and a second temperature sensor 90.

As illustrated in FIGS. 1 and 2, the tank housing 10 has an inner space 11 formed therein and is disposed on the ground in a longitudinal direction so that a fluid is introduced into the inner space 11 from an upper side, and the fluid introduced into the inner space 11 is discharged to a lower side. In one embodiment, the tank housing 10 is formed so that a height H in the longitudinal direction is greater than or equal to at least four times the maximum width W in a transverse direction.

Here, the tank housing 10 may be formed in a cylindrical shape. However, the tank housing 10 is not limited to being formed in a cylindrical shape and may be formed in various other shapes as long as the height H in the longitudinal direction is greater than or equal to at least four times the maximum width W in the transverse direction.

Since the tank housing 10 is formed so that the height H in the longitudinal direction is greater than or equal to at least four times the maximum width W in the transverse direction, in the case in which a direct water type fluid is supplied to the tank housing 10 with a high pressure, it is possible to prevent the fluid from stagnating in a partial region inside the tank housing 10 and prevent degradation of cold water extraction performance.

A material of the tank housing 10 may be stainless steel. However, the material of the tank housing 10 is not limited to stainless steel and may be various other metals resistant to corrosion.

As illustrated in FIG. 2, a fluid inflow pipe 14 into which a fluid is introduced so that the fluid is introduced into the tank housing 10 is provided at an upper side of the tank housing 10. Here, one end of the fluid inflow pipe 14 that is near the inner space 11 of the tank housing 10 is disposed at an upper side of the inner space 11. Accordingly, clean water introduced into the inner space 11 moves downward from an upper portion of the inner space 11 of the tank housing 10.

As illustrated in FIG. 2, the evaporator 20 is disposed in the longitudinal direction in the inner space 11 of the tank housing 10 so that the fluid introduced into the tank housing 10 may be cooled while moving downward.

Here, as illustrated in FIG. 4, the evaporator 20 includes a refrigerant pipe 22 filled with a refrigerant, and the refrigerant moves by being guided by the refrigerant pipe 22. In a process in which the refrigerant moves along the refrigerant pipe 22, as the fluid comes in direct contact with the refrigerant pipe 22, heat exchange occurs between the refrigerant and the fluid, and the fluid is cooled.

Referring to FIGS. 1, 2, and 6, the refrigerant pipe 22 has both end portions **20*a* and 20*b* passing through a ceiling portion 16 of the tank housing 10 and a central portion disposed in the inner space 11. Here, in order to improve efficiency of heat exchange between the refrigerant pipe 22 and the fluid, the central portion of the refrigerant pipe 22 extends toward a lower portion of the inner space 11, that is, in a direction identical to an extending direction of the tank housing 10**.

Accordingly, a lower bending portion 24 having a curvature to change a movement direction of the refrigerant from downward to upward is formed at the central portion of the refrigerant pipe 22. The lower bending portion 24 is formed in a U-shape. However, the refrigerant pipe 22 is not limited to being formed in a U-shape and may have various other structures in which the fluid is moved via the inside of the tank housing 10. A surface area of contact between the refrigerant pipe 22 and the fluid may be increased by the lower bending portion 24. Accordingly, fluid cooling efficiency may be improved.

Here, as illustrated in FIG. 7, according to a modification of the evaporator of the cold water tank 1 for a direct water purifier according to one embodiment of the present disclosure, the evaporator 20 may include (N+1) lower bending portions 24 and N upper bending portions 26. Here, N is an integer, and for example, when the number of lower bending portions 24 is two, one upper bending portion 26 may be formed. In this way, since a surface area where the fluid positioned in the inner space 11 comes in contact with the refrigerant pipe 22 increases with an increase in the length of the refrigerant pipe 22, fluid cooling efficiency may be improved.

Meanwhile, as illustrated in FIG. 2, as the fluid introduced from an upper side of the inner space 11 of the tank housing 10 is cooled by the refrigerant pipe 22, the density of the fluid increases, and the fluid that has been cooled relatively more moves downward due to a convection phenomenon. Accordingly, since a fluid with a relatively high temperature can be repeatedly cooled by moving to the upper side of the inner space 11 by convection before being discharged through the cold water outlet 50, cooling efficiency may be improved.

A material of the evaporator 20 may be copper. However, the material of the evaporator 20 is not limited to copper and may be various other metals with high thermal conductivity.

As illustrated in FIG. 3, the connector 30 for changing a movement direction of the fluid, which is cooled by heat exchange with the refrigerant pipe 22 and moved to the lower portion of the inner space 11, to upward is disposed at a lower portion of the tank housing 10.

Here, the connector 30 of the cold water tank 1 for a direct water purifier according to one embodiment of the present disclosure may include a first outlet 32, a first inlet 34, a connection pipe 36, a first coupling portion 38, and a first fixing member 39.

As illustrated in FIG. 3, the first outlet 32 is formed to protrude downward from a bottom portion of the tank housing 10. The first outlet 32 may be formed as a hollow protruding portion to enable fluid communication between the fluid of the inner space 11 and the outside of the tank housing 10. Accordingly, the fluid cooled in the inner space 11 of the tank housing 10 is discharged to the outside of the tank housing 10 through the first outlet 32.

Here, the cooled fluid may be smoothly discharged through the first outlet 32 disposed at a lower side of the tank housing 10 due to pressure formed in the inner space 11 due to the fluid introduced through the fluid inflow pipe 14 and the weight of the fluid itself disposed in the inner space 11.

As illustrated in FIG. 3, the first inlet 34 which is spaced apart from the first outlet 32 and protrudes to the lower side of the tank housing 10 is formed at the bottom portion of the tank housing 10 to allow the fluid discharged through the first outlet 32 to be introduced into the inner space 11 of the tank housing 10 again.

Like the first outlet 32, the first inlet 34 may be formed as a hollow protruding portion to enable fluid communication with the outside of the tank housing 10. Here, the first outlet 32 and the first inlet 34 may be connected by the connection pipe 36. The connection pipe 36 guides the fluid discharged through the first outlet 32 and changes a movement direction of the fluid toward the inner space 11.

The connection pipe 36 may be detachably coupled to the first outlet 32 and the first inlet 34. Accordingly, in the case in which the connection pipe 36 that is relatively more exposed to the outside of the tank housing 10 is damaged, a user may easily replace the connection pipe 36. Further, even in a step of manufacturing a bottom portion 18 of the tank housing 10, a simple structure facilitates injection molding.

As illustrated in FIG. 3, the first coupling portion 38 protruding toward the inner space 11 is formed on a bottom portion 18 of the tank housing 10. The first coupling portion 38 may be formed in a hollow shape so that a passage is formed at a central portion in an extending direction thereof and may be disposed in a row with the first inlet 34 to communicate with the first inlet 34 with the bottom portion 18 of the tank housing 10 disposed therebetween. However, the position at which the first coupling portion 38 is formed is not limited as long as the passage formed in the first coupling portion 38 may be connected to a passage formed in the first inlet 34 so that fluid communication is possible therebetween. Here, the passage formed in the first coupling portion 38 is formed to be parallel to the extending direction of the tank housing 10.

As illustrated in FIG. 3, the cooled fluid discharged through the first outlet 32 and whose movement direction is changed through the connection pipe 36 moves to the inner space 11 via the first inlet 34 and the first coupling portion 38.

Here, as illustrated in FIG. 3, the first fixing member 39 is disposed at an end portion of the first coupling portion 38 that is near the inner space 11. The first fixing member 39 serves to fix the cold water pipe 40, which will be described below, to the first coupling portion 38 when the cold water pipe 40 is inserted into the first coupling portion 38. Also, the first coupling portion 38 serves to seal between the cold water pipe 40 and the first coupling portion 38 so that all of the fluid guided through the first coupling portion 38 is able to move to the cold water pipe 40.

To this end, as illustrated in FIG. 3, the first fixing member 39 is disposed between an outer peripheral surface of the cold water pipe 40 and an inner peripheral surface of the first coupling portion 38. Here, the first fixing member 39 is disposed to surround an inner side surface and an outer side surface of an edge portion of an upper end portion of the first coupling portion 38. Since the first fixing member 39 is disposed in this way, when a lower end portion 43 of the cold water pipe 40 is inserted downward into the first coupling portion 38, the first fixing member 39 may be more firmly coupled to the first coupling portion 38 due to a frictional force between the first fixing member 39 and the cold water pipe 40.

The first fixing member 39 may be formed of an elastic material such as rubber to prevent an outflow of a fluid between the cold water pipe 40 and the first coupling portion 38.

Meanwhile, the cold water pipe 40 is connected to the first coupling portion 38. Here, the fluid cooled by coming in contact with the refrigerant pipe 22 inside the tank housing 10 is introduced into the cold water pipe 40 through the first coupling portion 38 after the movement direction of the fluid is changed to upward through the connection pipe 36.

Accordingly, the fluid moved into the cold water pipe 40 moves to the upper portion of the inner space 11 of the tank housing 10 along the cold water pipe 40. In a process in which the fluid moves to the upper portion along the cold water pipe 40, the fluid inside the cold water pipe 40 is cooled again with the fluid being cooled in the inner space 11 and maintains a low-temperature state. This is because the fluid of the inner space 11 may maintain a low-temperature state due to being positioned relatively closer to the refrigerant pipe 22 than the fluid inside the cold water pipe 40.

In this way, through a structure in which the fluid is primarily cooled inside the tank housing 10 and secondarily cooled along the cold water pipe 40 that passes through the inside of the tank housing 10, not only is it possible to rapidly cool the fluid, but also the cooled fluid may maintain a low-temperature state without a temperature change until the fluid is discharged to the user.

As illustrated in FIG. 4, an upper end portion 41 of the cold water pipe 40 is connected to the cold water outlet 50 formed at a side surface of an upper end portion of the tank housing 10. The fluid that has passed through the inner space 11 of the tank housing 10 along the cold water pipe 40 is discharged through the cold water outlet 50 while maintaining a low-temperature state.

Here, as illustrated in FIG. 4, a curve portion 42 is formed at the cold water pipe 40 so that the cold water pipe 40 may be formed to be bent in the transverse direction in order to be connected to the cold water outlet 50 formed at the side surface of the upper end portion of the tank housing 10. Here, as illustrated in FIG. 5, the cold water pipe 40 may be elastically deformed in a direction opposite to a bending direction of the curve portion 42 in a state in which the lower end portion of the cold water pipe 40 is coupled to the first coupling portion 38. (Hereinafter, description will be given with the bending direction of the curve portion 42 defined as forward and the direction opposite thereto defined as rearward.)

Accordingly, when the user couples the cold water pipe 40 to the tank housing 10, first, the user couples the lower end portion 43 of the cold water pipe 40 to the first coupling portion 38. Then, while pulling the upper end portion 41 of the cold water pipe 40 in the direction opposite to the bending direction of the curve portion 42, the user adjusts the upper end portion 41 of the cold water pipe 40 to allow the upper end portion 41 of the cold water pipe 40 to be coupled to the cold water outlet 50 and then presses the upper end portion 41 of the cold water pipe 40 in the bending direction of the curve portion 42 to couple the upper end portion 41 of the cold water pipe 40 to the cold water outlet 50.

Conversely, when the user separates the cold water pipe 40 from the tank housing 10, first, the user pulls the upper end portion 41 of the cold water pipe 40 in the direction opposite to the bending direction of the curve portion 42 to separate the upper end portion 41 of the cold water pipe 40 from the cold water outlet 50 and then separates the lower end portion 43 of the cold water pipe 40 from the first coupling portion 38.

In this way, by the cold water pipe 40 having the curve portion 42, the user may easily couple or separate the cold water pipe 40 to or from the tank housing 10, and from this, not only is it possible to reduce the time taken to manufacture a water purifier, but also, since both end portions of the cold water pipe 40 are coupled to the inside of the tank housing 10, a problem of detachment of the cold water pipe may be prevented even when external impact is applied.

As illustrated in FIG. 4, the cold water outlet 50 to which the upper end portion 41 of the cold water pipe 40 is coupled is formed at the side surface of the upper end portion of the tank housing 10 and discharges the fluid moved along the cold water pipe 40 to the outside of the tank housing 10.

Here, the cold water outlet 50 according to one embodiment of the present disclosure includes a sidewall portion 52, a side cover 54, a second coupling portion 56, and a second fixing member 58.

As illustrated in FIG. 4, the sidewall portion 52 is formed in a cylindrical shape that protrudes from the side surface of the upper end portion of the tank housing 10. Accordingly, a central portion of the sidewall portion 52 is penetrated to enable communication between the inner space 11 of the tank housing 10 and the outside of the tank housing 10.

The side cover 54 configured to block the inner space 11 from the outside of the tank housing 10 is coupled to a front end of the sidewall portion 52. The side cover 54 prevents the fluid introduced into the inner space 11 from flowing to the outside through the sidewall portion 52. To this end, as illustrated in FIG. 4, a sealing member may be disposed between the side cover 54 and the sidewall portion 52.

The second coupling portion 56 to which the upper end portion 41 of the cold water pipe 40 is coupled is formed at the side cover 54. The second coupling portion 56 is formed to protrude from the side cover 54 toward the inner space 11. The second coupling portion 56 is formed in a cylindrical shape, and an inner cross-section of the second coupling portion 56 is formed to correspond to a cross-section of the cold water pipe 40 to allow the upper end portion 41 of the cold water pipe 40 to be inserted into the second coupling portion 56. The second coupling portion 56 is connected to a through-hole formed in the side cover 54 or a flow path formed outside the side cover 54 to allow the fluid moving along the cold water pipe 40 to be discharged to the outside after passing through the side cover 54.

Here, the second coupling portion 56 may be formed in the same shape as the first coupling portion 38. Accordingly, the cold water pipe 40 may be manufactured as a single pipe line of which an upper end portion and a lower end portion each have a constant cross-sectional shape, and thus the manufacturing time and manufacturing costs can be reduced.

Here, the second fixing member 58 is disposed between the second coupling portion 56 and the upper end portion 41 of the cold water pipe 40 to fix the cold water pipe 40 to the second coupling portion 56. However, since the second fixing member 58 only differs from the first fixing member 39 in terms of size, and has the same shape and function, description of the second fixing member 58 is replaced with the description of the first fixing member 39.

Figure 8:
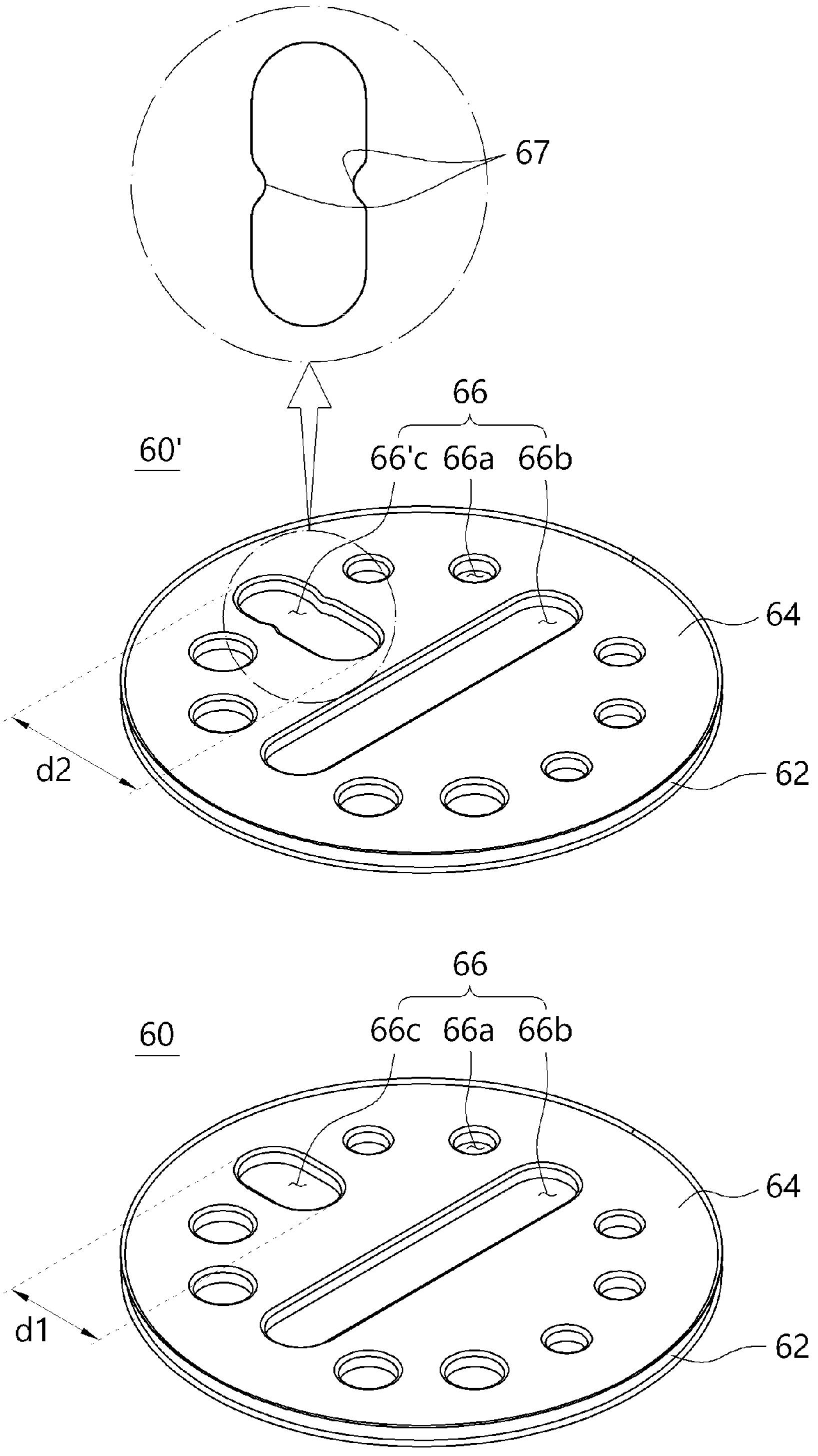
FIG. 8 is an enlarged view of a partition of the cold water tank for a direct water purifier according to one embodiment of the present disclosure.
Figure 9:
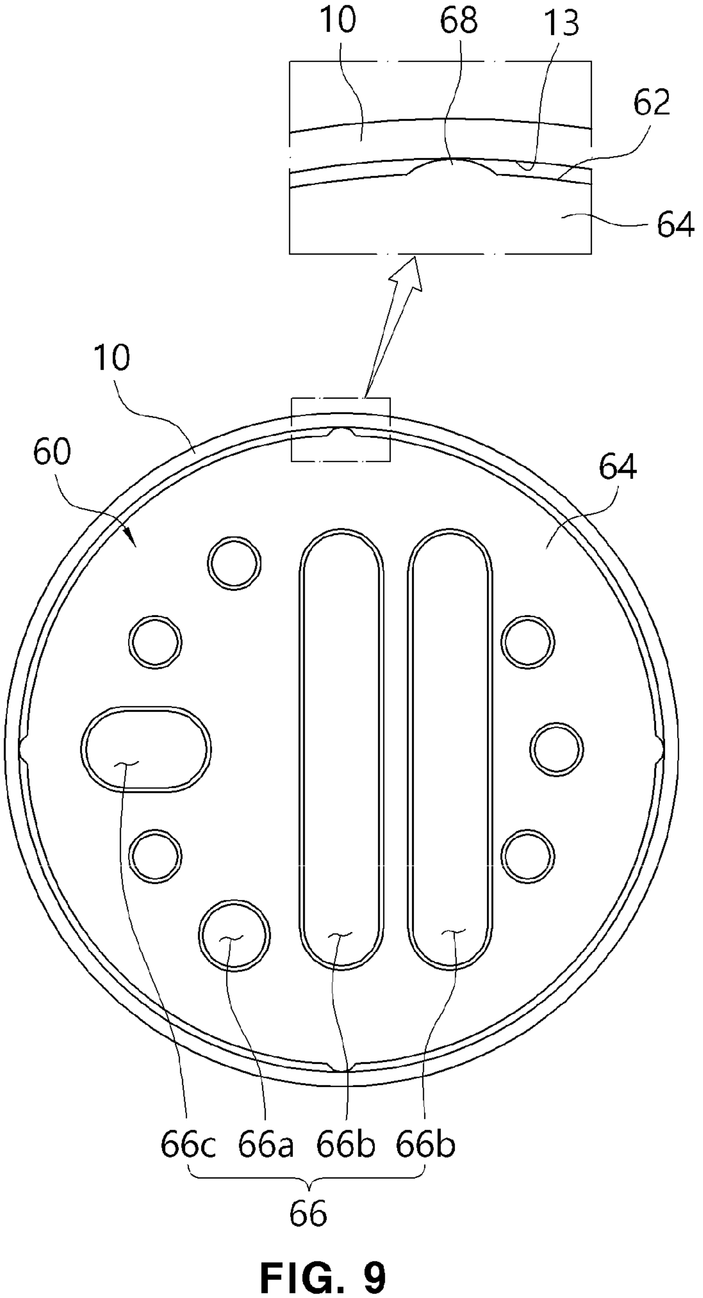
FIG. 9 is an enlarged view of a modification of the partition of the cold water tank for a direct water purifier according to one embodiment of the present disclosure.

FIG. 8 is an enlarged view of a partition of the cold water tank for a direct water purifier according to one embodiment of the present disclosure. FIG. 9 is an enlarged view of a modification of the partition of the cold water tank for a direct water purifier according to one embodiment of the present disclosure.

Meanwhile, as illustrated in FIG. 6, at least one partition 60 is disposed in the inner space 11 of the tank housing 10 of the cold water tank 1 for a direct water purifier according to one embodiment of the present disclosure.

The partition 60 divides the inner space 11 of the tank housing 10 in the transverse direction. Here, although two partitions 60 are disposed in the inner space 11 in the present embodiment, the number of partitions 60 is not limited.

To this end, as illustrated in FIGS. 8 and 9, the partitions 60 and 60' of the cold water tank 1 for a direct water purifier according to one embodiment of the present disclosure each include a partition plate 64 that corresponds to a cross-sectional shape of the tank housing 10, at least one through-hole 66 formed in the partition plate 64, and a protrusion 68 formed on an outer side portion 62 of the partition plate 64.

The partition plate 64 is formed to correspond to the cross-sectional shape of the tank housing 10. In the present embodiment, the cross-section of the tank housing 10 has a circular shape, and the partition plate 64 is formed in a disk shape to correspond to the circular shape.

The partition plate 64 allows a fluid to be cooled in each of individual spaces of the inner space 11 of the tank housing 10 divided by the partition plate 64. The fluid comes in contact with the refrigerant pipe 22 and circulates vertically due to a convection phenomenon in the individual spaces divided by the partition plate 64. Through the convection effect, cooling efficiency may be improved compared to when the fluid circulates throughout the inner space 11 of the tank housing 10. Here, in the case in which a plurality of partition plates 64 are disposed in the inner space 11 of the tank housing 10, intervals between the plurality of partition plates 64 may vary according to the fluid cooling efficiency.

In this way, through the convection phenomenon in the individual spaces divided by the partition plate 64, an effect of increasing a length of the refrigerant pipe 22 may be obtained without increasing a physical length of the refrigerant pipe 22, and thus there is an effect of reducing manufacturing costs of the cold water tank 1 for a direct water purifier.

Referring to FIGS. 6 and 8, a plurality of through-holes 66 are formed in the partition plate 64 of the partitions 60 and 60'. Here, the plurality of through-holes 66 of the cold water tank 1 for a direct water purifier according to one embodiment of the present disclosure include a first through-hole **66*b* through which the refrigerant pipe 22 passes, second through-holes 66*c* and 66'*c* through which the cold water pipe 40 passes, and a third through-hole 66*a*** formed to be penetrated to allow the fluid to move.

In order to improve cooling efficiency of the fluid positioned in the inner space 11 of the tank housing 10, the refrigerant pipe 22 is formed to extend for the lower bending portion 24 to be disposed at a lower side of the inner space 11. Therefore, when the partition plate 64 is disposed to divide the inner space 11, the refrigerant pipe 22 is disposed to pass through the partition plate 64.

Here, when the refrigerant pipe 22 passes through the first through-hole **66*b* formed in the partition plate 64, an outer peripheral surface of the refrigerant pipe 22 may be supported by an inner peripheral surface of the first through-hole 66*b*. Accordingly, the partition plate 64 also serves to provide support so that the refrigerant pipe 22 is able to be disposed at the center of the inner space 11 of the tank housing 10**.

Meanwhile, as illustrated in FIG. 8, the first through-hole **66*b* may be formed to extend. Accordingly, the lower bending portion 24 of the refrigerant pipe 22 may pass through the first through-hole 66*b* that is formed to extend. Therefore, due to the lower bending portion 24, both side portions of the refrigerant pipe 22 bent in a U-shape may be supported by both end portions of the first through-hole 66*b* in an extending direction thereof. In this way, since the partition plate 64 may be coupled to the tank housing 10 after being manufactured in a state in which the refrigerant pipe 22 is not inserted into the partition plate 64, not only is it possible to reduce manufacturing costs and manufacturing time, but also the refrigerant pipe 22 alone may be easily replaced when replacement of the refrigerant pipe 22 is needed during use of the cold water tank 1** for a direct water purifier.

As illustrated in FIGS. 7 and 9, the first through-hole **66*b* may be formed as a plurality of first through-holes 66*b*. This is to, in the case in which the lower bending portion 24 of the refrigerant pipe 22 is formed as a plurality of lower bending portions 24 to improve cooling efficiency of the refrigerant pipe 22, support the lower bending portions 24 by allowing each lower bending portion 24 to be inserted into one of the plurality of first through-holes 66*b*. Therefore, the number of first through-holes 66*b* formed to extend corresponds to the number of lower bending portions 24**.

Meanwhile, as illustrated in FIGS. 5 and 8, the cold water pipe 40 is inserted into the second through-holes **66*c* and 66'*c*. Here, since the cold water pipe 40 may be elastically deformed to a rear of the curve portion 42 in order to be coupled to the second coupling portion 56 as described above, the second through-holes 66*c* and 66'*c* are formed to extend to the rear of the curve portion 42**.

Here, as illustrated in FIGS. 5 and 8, in the case in which the partition plate 64 is formed as a plurality of partition plates 64, an extension length d2 of the second through-hole **66'*c* of the partition plate 64 of the partition 60' disposed at an upper side may be formed to be longer than an extension length d1 of the second through-hole 66*c* of the partition plate 64 of the partition 60 disposed at a lower side. In the case in which the number of partitions 60 is three or more, the partitions 60 may be disposed so that the extension lengths of the second through-holes 66*c* and 66'*c*** gradually increase from the lower side to the upper side.

This is to allow a rear side surface of the cold water pipe 40 to be supported by rear inner side surfaces of the plurality of second through-holes **66*c* when the cold water pipe 40 is elastically deformed to the rear to couple the upper end portion 41 of the cold water pipe 40 to the second coupling portion 56 while the lower end portion 43 of the cold water pipe 40 is coupled to the first coupling portion 38 as illustrated in FIG. 5**.

Also, the length at which the second through-hole **66*c* extends serves to allow elastic deformation of the cold water pipe 40 only by a length necessary to install or separate the cold water pipe 40 at or from the second coupling portion 56 and prevent the cold water pipe 40 from being excessively deformed to the rear and damaged. Meanwhile, as illustrated in FIG. 8, a pair of fixing protrusions 67 are formed to protrude from both left and right sides of an inner peripheral surface of the second through-hole 66'*c* formed in the partition 60' at the upper side. The fixing protrusions 67 prevent the cold water pipe 40 from being detached to the rear in a state in which the upper end portion 41 of the cold water pipe 40 is coupled to the second coupling portion 56**.

On the other hand, when the upper end portion 41 of the cold water pipe 40 is pulled rearward when separating the upper end portion 41 of the cold water pipe 40 from the second coupling portion 56, the cold water pipe 40 may be disposed at the rear of the second through-hole **66'*c* formed in the partition 60' at the upper side after the cold water pipe 40 is elastically deformed and passes between the pair of fixing protrusions 67 from a front side of the second through-hole 66'*c*. In this case, opposite to the above, the cold water pipe 40 is prevented from being detached from the rear to the front, and it is possible to prevent an inconvenience that, when coupling or separating the cold water pipe 40, the user has to hold the cold water pipe to maintain a state in which the cold water pipe 40** is deformed to the rear.

Here, as illustrated in FIG. 8, the pair of fixing protrusions 67 may be formed at the second through-hole **66'*c* of the partition 60' disposed at the uppermost side and may not be formed in the second through-hole 66*c* of the other partition 60**.

Meanwhile, as illustrated in FIG. 8, a plurality of third through-holes 66*a* are formed in the partition 60. The plurality of third through-holes 66*a* provide passages through which a fluid, which is cooled inside the tank housing 10, may move from an upper space to a lower space in the individual spaces divided by the partition 60.

The plurality of third through-holes 66*a* may be disposed at predetermined intervals in a circumferential direction of the partition 60. Here, as illustrated in FIG. 8, the third through-holes 66*a* may be disposed to be relatively spaced apart from the first through-hole 66*b* through which the refrigerant pipe 22 passes. In this way, when the cooled fluid moves downward in the vicinity of the refrigerant pipe 22 due to its high density, the fluid is prevented from immediately moving to the lower portion of the inner space 11 through the third through-holes 66*a*, and thus cooling efficiency may be improved. However, positions at which the third through-holes 66*a* are formed on the partition plate 64 are not limited.

Meanwhile, a ratio between an area of the partition plate 64 and areas of the plurality of through-holes 66 including the first through-hole 66*b*, the second through-holes 66*c* and 66'*c*, and the third through-holes 66*a* is in a range of about 3:1 to 14:1. When the areas of the plurality of through-holes 66 increase such that a ratio between an area of the partition 60 and the areas of the plurality of through-holes 66 deviates from 3:1, the fluid may rapidly move downward and may not be mixed by the convection phenomenon inside the tank housing 10, and thus cooling efficiency may be degraded.

Also, when the areas of the plurality of through-holes 66 decrease such that a ratio between the area of the partition plate 64 and the areas of the plurality of through-holes 66 deviates from 14:1, downward movement of the fluid may not be smooth, and cold water extraction may take a long time. In this way, when the ratio between the area of the partition 60 and the areas of the plurality of through-holes 66 is about 3:1 to 14:1, the time taken for cold water extraction may be shortened, and cooling efficiency may be improved.

Meanwhile, as illustrated in FIG. 9, one or more protrusions 68 that protrude from the outer side portion 62 having a shape corresponding to an inner side surface 13 of the tank housing 10 and come in contact with the inner side surface 13 of the tank housing 10 are provided on the partition plate 64.

The outer side portion 62 is disposed to be spaced apart from the inner side surface 13 of the tank housing 10. Accordingly, for the partition 60 to be coupled to the tank housing 10, the partition 60 is smoothly inserted into the tank housing 10.

Since the one or more protrusions 68 come in contact with the inner side surface 13 of the tank housing 10 when the partition plate 64 is disposed at a position for installation inside the tank housing 10, the partition 60 is fixed inside the tank housing 10.

Also, the one or more protrusions 68 are disposed to be spaced apart at equal intervals from each other and are formed of an elastic material. Accordingly, the protrusions 68 may increase a fixing force with which the partition 60 is fixed to the tank housing 10.

Meanwhile, the cold water tank 1 for a direct water purifier according to one embodiment of the present disclosure may further include a temperature sensor.

Here, as illustrated in FIGS. 2, 3, and 4, the temperature sensor may be provided as a plurality of temperature sensors. In the present embodiment, the first temperature sensor 80 disposed adjacent to the cold water outlet 50 and the second temperature sensor 90 disposed adjacent to the first coupling portion 38 are provided.

As illustrated in FIG. 4, the first temperature sensor 80 is disposed to pass through an upper side surface of the tank housing 10. The first temperature sensor 80 measures a temperature of a fluid adjacent to the cold water outlet 50. Accordingly, a temperature of cold water discharged from the tank housing 10 is measured based on the temperature calculated by the first temperature sensor 80, and when there is a difference between an optimal temperature and the temperature of cold water to be discharged, a temperature of the refrigerant moving along the refrigerant pipe 22 is controlled.

As illustrated in FIG. 3, the second temperature sensor 90 is disposed to pass through the lower side of the tank housing 10. The second temperature sensor 90 measures a temperature of a fluid discharged through the first outlet 32 to calculate a temperature of the fluid introduced into the cold water pipe 40. Accordingly, the temperature calculated by the second temperature sensor 90 is compared with the temperature of cold water discharged from the tank housing 10 that is calculated by the first temperature sensor 80, and when the temperature measured by the first temperature sensor 80 is higher than the temperature measured by the second temperature sensor 90 by a predetermined value or more, the temperature of the refrigerant is controlled.

Here, the temperature sensors including the first temperature sensor 80 and the second temperature sensor 90 have a first sensing portion 82 and a second sensing portion 92, which are configured to measure a temperature, disposed to be spaced 20 mm or more and 30 mm or less from the refrigerant pipe 22, and the first sensing portion 82 and the second sensing portion 92 may be disposed to be spaced 25 mm from the refrigerant pipe 22. When the first sensing portion 82 and the second sensing portion 92 are disposed to be spaced less than 20 mm from the refrigerant pipe 22, due to an influence of the refrigerant pipe 22, it may be difficult to accurately measure the temperature of the fluid. Therefore, by the first sensing portion 82 and the second sensing portion 92 being disposed to be appropriately spaced apart from the refrigerant pipe 22, an influence of the refrigerant pipe 22 may be minimized, and the temperature of the fluid may be accurately measured.

Figure 10:
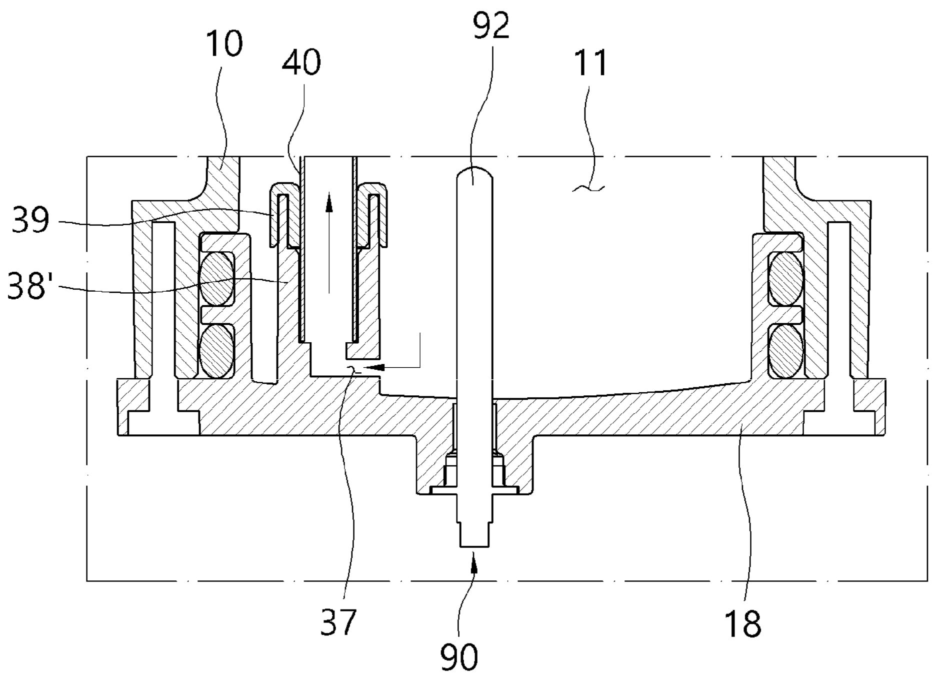
FIG. 10 is an enlarged cross-sectional view of a connector of the cold water tank for a direct water purifier according to another embodiment of the present disclosure.

FIG. 10 is an enlarged cross-sectional view of a connector of the cold water tank for a direct water purifier according to another embodiment of the present disclosure.

Here, the connector 30 of the cold water tank 1 for a direct water purifier according to another embodiment of the present disclosure may include a first coupling portion 38' and a first fixing member 39.

The first coupling portion 38' formed to protrude toward the inner space 11 is formed on the bottom portion 18 of the tank housing 10. The first coupling portion 38' is formed in a hollow cylindrical shape so that a passage is formed at a central portion of the first coupling portion 38' in an extending direction thereof. Here, the passage formed in the first coupling portion 38' is formed to be parallel to the extending direction of the tank housing 10.

As illustrated in FIG. 10, a cold water through-hole 37 is formed in a side surface of a lower end of the first coupling portion 38' to enable fluid communication between the passage inside the first coupling portion 38' and the inner space 11 of the tank housing 10. Here, when the fluid cooled in the inner space 11 of the tank housing 10 moves downward due to a density difference, the fluid moves along the passage inside the first coupling portion 38' through the cold water through-hole 137.

The lower end portion of the cold water pipe 40 is inserted into and coupled to the first coupling portion 38', and the fluid introduced into the first coupling portion 38' through the cold water through-hole 37 is introduced into the cold water pipe 40 and discharged through the cold water outlet 50. To this end, as illustrated in FIG. 10, a side surface of the lower end portion of the cold water pipe 40 is disposed to be spaced apart from the bottom portion 18 of the tank housing 10 so as not to block the cold water through-hole 37.

In this way, by removing the first outlet 32, the first inlet 34, and the connection pipe 36 of the cold water tank 1 for a direct water purifier according to one embodiment of the present disclosure, constraints of the space in the tank housing 10 may be reduced, and damage to the tank housing 10 during transportation of the tank housing 10 may be reduced.

Here, the first fixing member 39 is provided to fix the lower end portion 43 of the cold water pipe 40 to the first coupling portion 38'. However, since the first fixing member 39 is the same as the first fixing member 39 of the cold water tank 1 for a direct water purifier according to one embodiment of the present disclosure that has been described above, detailed description of the first fixing member 39 will be omitted here.

The present disclosure relates to a cold water tank for a direct water purifier for cooling a fluid. From the detailed description given above with reference to the drawings, it can be seen that manufacturing costs of the cold water tank for extracting cold water can be reduced, cold water extraction performance can be improved, and the user is able to easily install or separate a cold water pipe.

A cold water tank for a direct water purifier has been described above according to various embodiments of the present disclosure, but the cold water tank for a direct water purifier according to the embodiments herein is not necessarily used to cool clean water filtered from a water purifier, and those of ordinary skill in the art to which the present disclosure pertains should clearly understand that the cold water tank for a direct water purifier according to the embodiments herein may be used in any device that requires cooling of a fluid.

Exemplary embodiments according to the present disclosure have been described above, but it should be apparent to those of ordinary skill in the art that the present disclosure may be embodied in other specific forms without departing from the gist or scope thereof. Therefore, the above-described embodiments should be considered as illustrative instead of limiting, and accordingly, the present disclosure is not limited to the above-given description and may be changed within the scope of the attached claims and their equivalents.

The invention claimed is:

1. A cold water tank for a direct water purifier, the cold water tank comprising:

a tank housing having an inner space formed in the tank housing, formed so that a height in a longitudinal direction is greater than or equal to at least four times the maximum width in a transverse direction, and disposed in the longitudinal direction so that a fluid is introduced from an upper side and the fluid is discharged to a lower side;

an evaporator disposed in the inner space to guide movement of a refrigerant for cooling the fluid;

a connector disposed under the tank housing to change a movement direction of the fluid from downward to upward;

a cold water pipe having a lower end portion connected to the connector, formed to extend to guide the cooled fluid to an upper side of the inner space, and disposed in the longitudinal direction in the inner space;

at least one partition configured to divide the inner space in the transverse direction and having a plurality of through-holes formed in the at least one partition; and a cold water outlet formed at an upper end portion of the tank housing and connected to an upper end of the cold water pipe to discharge the fluid to the outside of the tank housing, wherein the cold water outlet comprises, a second coupling portion formed at a side surface of the upper end portion of the tank housing and protruding from a side of the cold water outlet facing the inner space so that the upper end portion of the cold water pipe is inserted into the second coupling portion, wherein the plurality of through-holes include second through-holes through which the cold water pipe passes, and wherein the second through-hole has a pair of fixing protrusions formed to protrude from both inner side surfaces of the second through-hole in a direction perpendicular to an extending direction of the second through-hole so that the cold water pipe inserted to pass through the second through-hole is fixed to one side of the second through-hole in the extending direction of the second through-hole.

2. The cold water tank of claim 1, wherein the connector includes a first coupling portion having a cylindrical shape and protruding upward from a bottom portion of the tank housing so that the lower end portion of the cold water pipe is inserted into the first coupling portion in the longitudinal direction.

3. The cold water tank of claim 1, wherein a ratio between an entire area of the partition and areas of the plurality of through-holes is in a range of 3:1 to 14:1.

4. The cold water tank of claim 1, wherein:

an outer side portion of the partition is formed in a shape that corresponds to an inner side surface of the tank housing;

the partition includes at least one protrusion that protrudes from the outer side portion of the partition and comes in contact with the inner side surface of the tank housing; and the outer side portion of the partition is disposed to be spaced apart from the inner side surface of the tank housing.

5. The cold water tank of claim 1, wherein:

the evaporator includes a refrigerant pipe having both end portions passing through a ceiling portion of the tank housing and a central portion disposed in the inner space;

the refrigerant pipe includes a lower bending portion formed to extend in the longitudinal direction and configured to change a movement direction of the refrigerant from downward to upward; and the plurality of through-holes include a plurality of first through-holes through which the refrigerant pipe passes.

6. The cold water tank of claim 1, wherein:

the evaporator includes a refrigerant pipe having both end portions passing through a ceiling portion of the tank housing and a central portion disposed in the inner space;

the refrigerant pipe includes N upper bending portions formed to extend in the longitudinal direction and configured to change a movement direction of the refrigerant from upward to downward and (N+1) lower bending portions configured to change the movement direction of the refrigerant from downward to upward; and the plurality of through-holes include a plurality of first through-holes through which the refrigerant pipe passes (N is a natural number).

7. The cold water tank of claim 1, wherein:

the cold water pipe has an upper end portion formed to be bent in the transverse direction.

8. The cold water tank of claim 1, further comprising a first temperature sensor provided in the tank housing so that a first sensing portion of the first temperature sensor is disposed to be spaced apart from an upper portion of the evaporator adjacent to the cold water outlet and measures a temperature of the fluid.

9. The cold water tank of claim 1, further comprising a second temperature sensor provided in the tank housing so that a second sensing portion of the second temperature sensor is disposed to be spaced apart from a lower portion of the evaporator adjacent to a the bottom portion of the tank housing and measures a temperature of the fluid.

10. The cold water tank of claim 2, wherein the connector further includes a first fixing member disposed between an outer peripheral surface of the cold water pipe and an inner peripheral surface of the first coupling portion so that the lower end portion of the cold water pipe is fixed while inserted into the first coupling portion.

11. The cold water tank of claim 2, wherein the connector includes:

a first outlet which is hollow and protrudes downward from a bottom surface of the tank housing so that the fluid of the inner space is discharged to the outside;

a first inlet which is disposed to be spaced apart from the first outlet and protrudes downward from the bottom portion of the tank housing so that the fluid discharged through the first outlet is introduced into the inner space through the first coupling portion; and a connection pipe which has one end connected to the first outlet and another end connected to the first inlet to guide the fluid discharged through the first outlet to the first inlet.

12. The cold water tank of claim 2, wherein:

the connector further includes at least one cold water through-hole formed to pass through a side surface of a lower end portion of the first coupling portion, and the cold water pipe has a lower end coupled to the first coupling portion while spaced apart from the bottom portion of the tank housing so that the lower end of the cold water pipe is disposed at an upper side of the cold water through-hole.

13. The cold water tank of claim 5, wherein the first through-holes are formed to extend so that the lower bending portions pass through the first through-holes.

14. The cold water tank of claim 7, wherein the second through-hole is formed to extend in a direction opposite to the direction in which the upper end portion of the cold water pipe is bent so that the cold water pipe is able to be elastically deformed while passing through the second through-hole.

15. The cold water tank of claim 8, wherein the first sensing portion is disposed to be spaced 20 mm or more and 30 mm or less from the upper portion of the evaporator adjacent to the cold water outlet.

16. The cold water tank of claim 9, wherein the second sensing portion is disposed to be spaced 20 mm or more and 30 mm or less from the lower portion of the evaporator adjacent to the bottom portion of the tank housing.

* * * * *